United States Patent [19]

Ariga et al.

[11] Patent Number: 4,593,850
[45] Date of Patent: Jun. 10, 1986

[54] AUTOMATIC WELDING APPARATUS

[75] Inventors: Yoshio Ariga, Kawagoe; Shinpei Watanabe, Hidakamachi, both of Japan

[73] Assignee: Honda Giken Kogyo Kabushiki Kaisha, Tokyo, Japan

[21] Appl. No.: 734,318

[22] Filed: May 14, 1985

[51] Int. Cl.$^4$ .................. B23K 37/04; B23K 28/02
[52] U.S. Cl. ................................ 228/47; 219/80
[58] Field of Search ............ 228/45, 47, 49.1, 26; 219/79, 80

[56] References Cited

U.S. PATENT DOCUMENTS

| 3,729,125 | 4/1973 | Hano ........................... 228/26 X |
| 4,160,147 | 7/1979 | Matsubara et al. ........... 219/80 X |
| 4,448,341 | 5/1984 | Fujikawa et al. ............ 228/47 X |
| 4,538,044 | 8/1985 | Kadowaki et al. .......... 228/47 X |

Primary Examiner—Kenneth J. Ramsey
Attorney, Agent, or Firm—Armstrong, Nikaido, Marmelstein & Kubovcik

[57] ABSTRACT

An automatic welding apparatus is comprising a replaceable jig table, a conveying device for carrying the jig table between a setting station and a welding station and temporary welding device mounted on the jig table for applying temporary welds to a workpiece while the jig table is being moved by the conveying device. At least one holding device at the welding station removes the temporarily welded workpiece from the jig table and holds the workpiece therein and an additional welding device is positioned with respect to the holding device for permanently welding the workpiece while the workpiece is held by the holding device and the jig table is being returned to the setting station by the conveying device.

6 Claims, 6 Drawing Figures

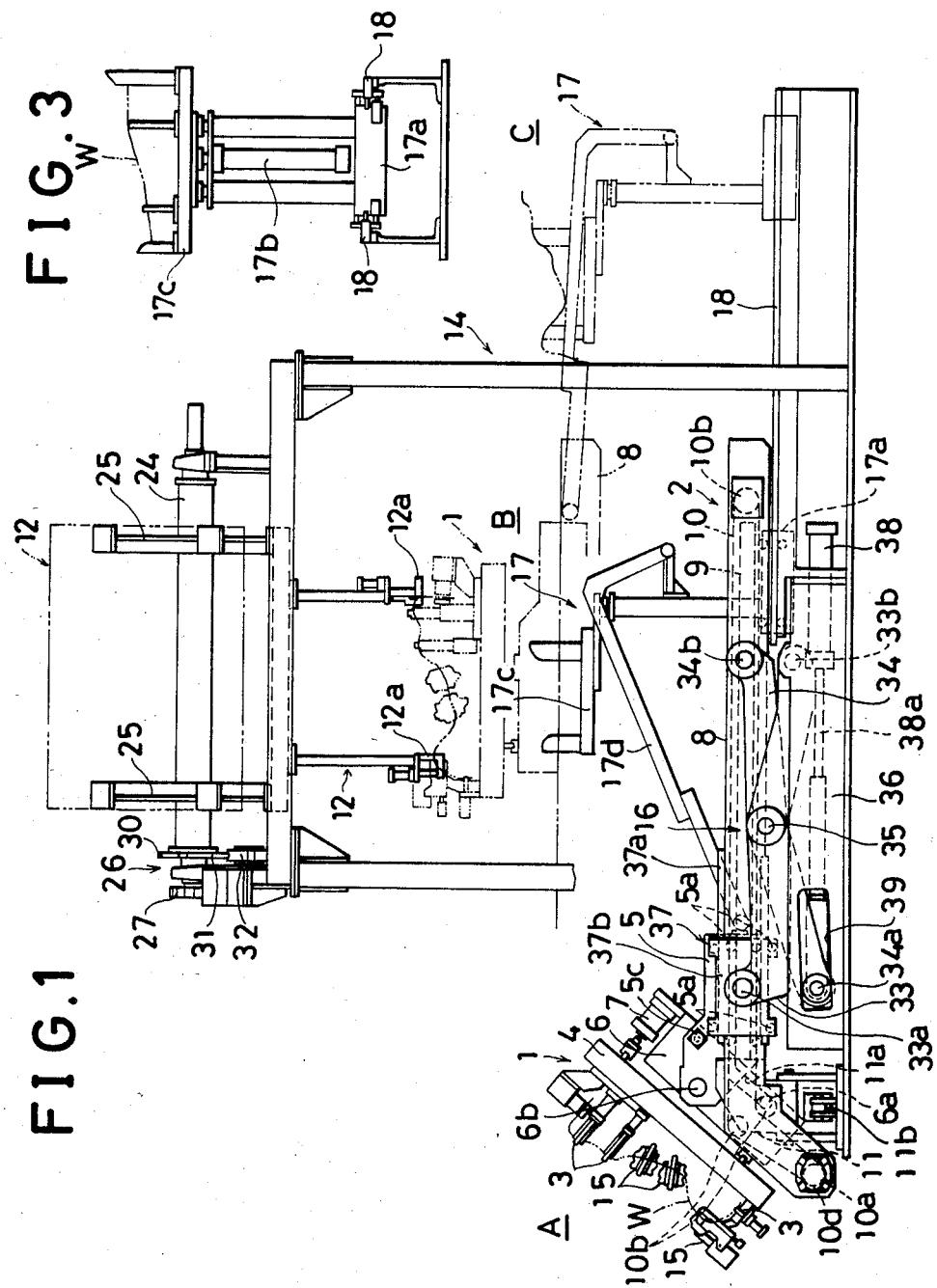

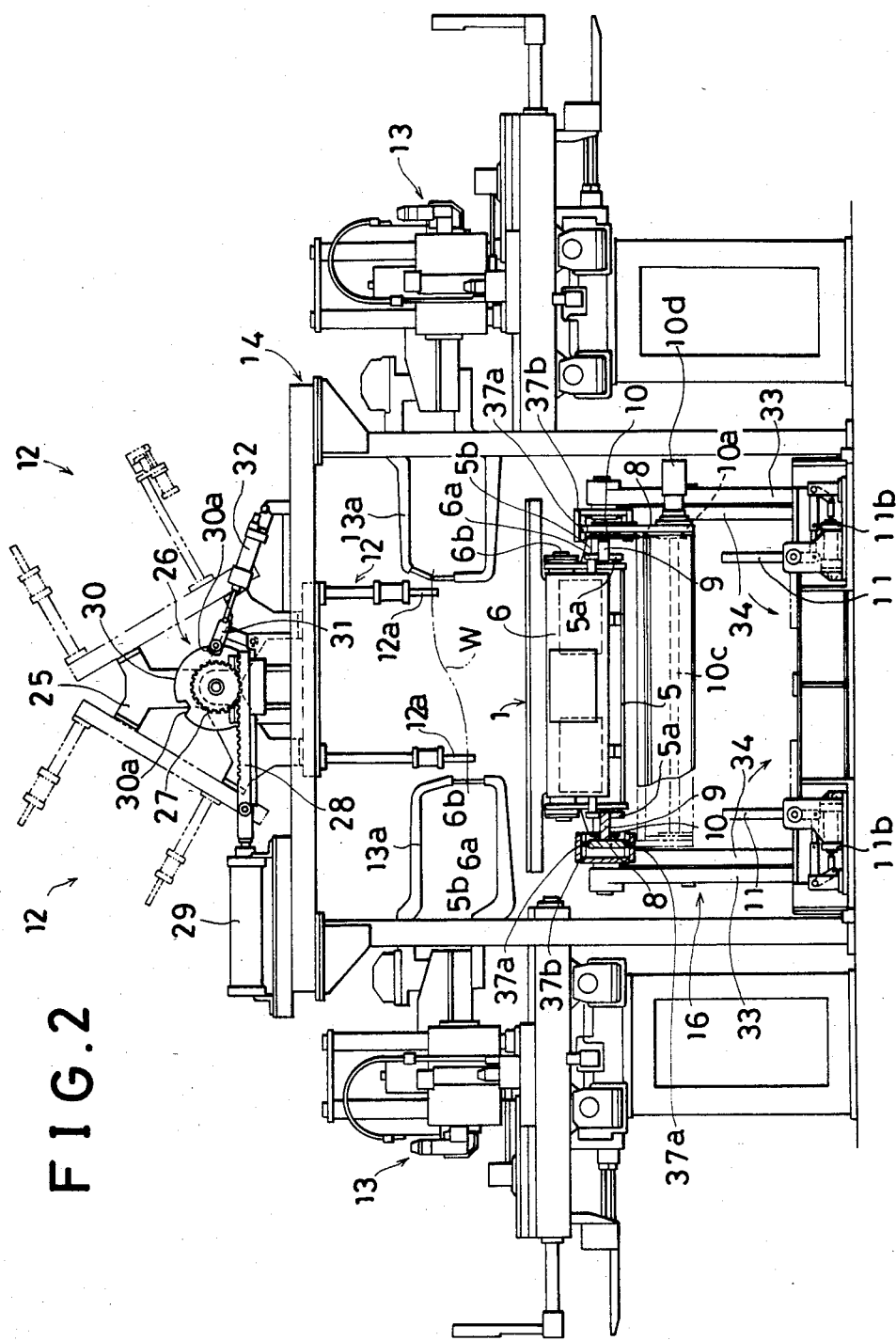

1

AUTOMATIC WELDING APPARATUS

BACKGROUND OF THE INVENTION

1. Field of the Invention

This invention relates to an automatic welding apparatus for use with a workpiece comprising plural divided parts, and which is so operated that the parts are first fixed with a temporary weld to form an integral unit, and the integral unit is then additionally welded to form a workpiece product.

2. Description of the Prior Art

In welding apparatus, as disclosed in Japanese Patent Publication No. Sho 56-7473, for instance, a jig table for workpiece setting is reciprocated, by means of a conveying means which extends in the front to rear direction, between a welding station in the front and a setting station in the rear. A first welding means for temporary welding and a second welding means for additional welding are provided at the welding station and operate alternatively. Thus, after a workpiece set on the jig table is temporarily welded by the first welding means, the jig table is moved upwards so that the workpiece may be transferred to a workpiece holding means provided at an upper portion of the welding station. After the transfer of the workpiece, the jig table is moved back to the setting station, and during this time, the workpiece, held by the holding means, is additionally welded by the second welding means, and during the additional welding operation, a setting operation of the next workpiece on the jig table may be carried out at the setting station.

This type of welding apparatus, however, is inconvenient in that the next additional weld on the next workpiece cannot be carried out unless procedural steps are completed, after the completion of the additional welding. Specifically, the jig table is moved to be introduced into the welding station, and thereafter, the temporary weld is made on the earlier workpiece and the transfer thereof to the holding means by elevating of the jig table is carried out.

SUMMARY OF THE INVENTION

It is the primary object of the present invention to provide an automatic welding apparatus which substantially reduces the time for welding a workpiece.

It is another object of the present invention to provide an automatic welding apparatus in which temporary welds are applied to the workpiece during the time that the workpiece is being conveyed from a setting station to a permanent welding station.

It is still another object of the present invention to provide an automatic welding apparatus in which a jig table includes a detachably mounted jig body such that the jig body can be easily changed for different workpieces.

It is still a further object of the present invention to provide an automatic welding apparatus which includes a plurality of holding means for holding various types of workpieces wherein the holding means being used can be changed in correspondence to the workpiece being welded.

The present invention is directed to an automatic welding apparatus comprising a replaceable jig table, a conveying device for carrying the jig table between a setting station and a welding station and temporary welding device mounted on the jig table for applying temporary welds to a workpiece while the jig table is being moved by the conveying device. At least one holding device at the welding station removes the temporarily welded workpiece from the jig table and holds the workpiece therein and an additional welding device is positioned with respect to the holding device for permanently welding the workpiece while the workpiece is held by the holding device and the jig table is being returned to the setting station by the conveying device.

BRIEF DESCRIPTION OF THE DRAWINGS

FIG. 1 is a side view of one example of this invention apparatus;

FIG. 2 is a front view, viewed from the left side in FIG. 1, with the conveying means at an elevated position and with a jig body thereof being omitted from a viewpoint of simplification;

FIG. 3 is a front view of an unloading means thereof;

DETAILED DESCRIPTION OF THE PREFERRED EMBODIMENTS

Figure 4:
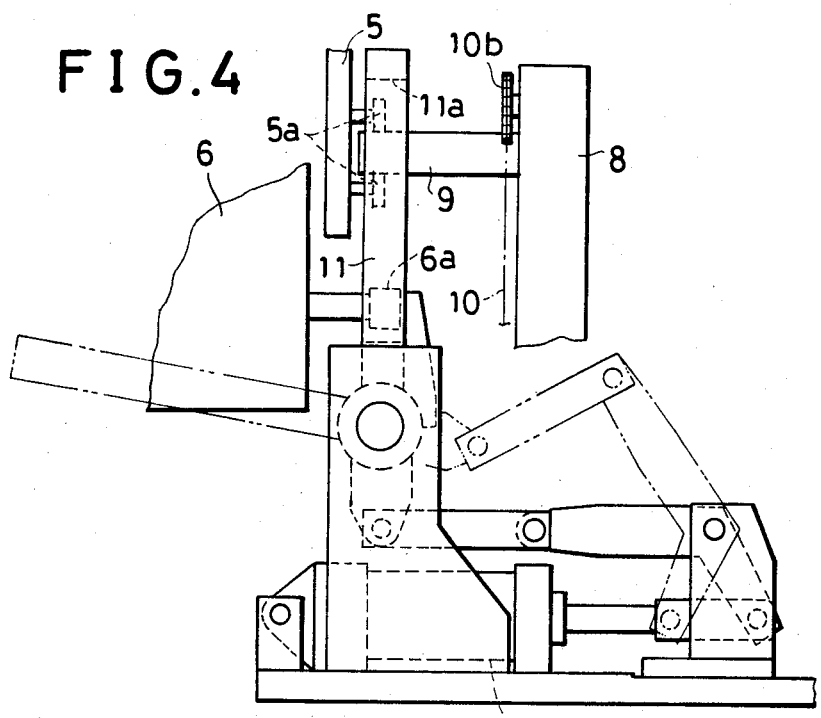
FIG. 4 is a front view of a cam plate which is to be provided at a setting station thereof.

Referring to FIGS. 1 and 2, a jig table 1 is provided for setting a workpiece, and a conveying means 2 reciprocates the jig table 1 between a welding station B in the front and a setting station A in the rear. The jig table 1 comprises a jig body 4 having plural setting members 3 such as positioning pins, and clamp members or the like for positioning and fixing plural divided parts of a workpiece W. The jig body 4 is detachably and replaceably attached to a jig base 6 supported on a carrier 5, through a replacement mechanism arranged to be operated by attaching and detaching cylinders 7. The conveying means 2 comprises a pair of right and left side plates 8 extending in the front to rear direction between the two stations A and B. Each of the side plates 8 is provided on its inside surface with a guide rail 9 and a conveying chain 10 extending in the lengthwise direction thereof. The carrier 5 is provided between the two side plates 8 and is movably supported by plural guide rollers 5a on each side of a guide rail 9 and is connected through a connecting member 5b to the chain 10 on each side. The reciprocating circulation driving of each chain 10 gives the carrier 5, and accordingly, the jig table 1 a reciprocating movement between the setting station A and the welding station B. Additionally, the jig base 6 is tiltably supported on the carrier 5, and each cam plate 11, which has a cam groove 11a which is inclined downwards and rearwardly and continues to each guide rail 9, is tiltable, as shown clearly in FIG. 4. At the setting station A, the cam 11 is positioned inside the rear end portion of each side plate 8 so that if the jig table 1 is returned to the setting station A when each cam plate 11 is raised upright and each of the protruding guide rollers 6a are on both sides of the rear end portion of the jig base 6 and may be inserted into each cam groove 11a. Thereby, the jig base 6 may be tilted rearwards and downwards about its pivot portion 6b, and as a result, the setting of a workpiece on the jig body 4 at the setting station A can be carried out easily by a worker in an easy, comfortable posture.

Figure 6:
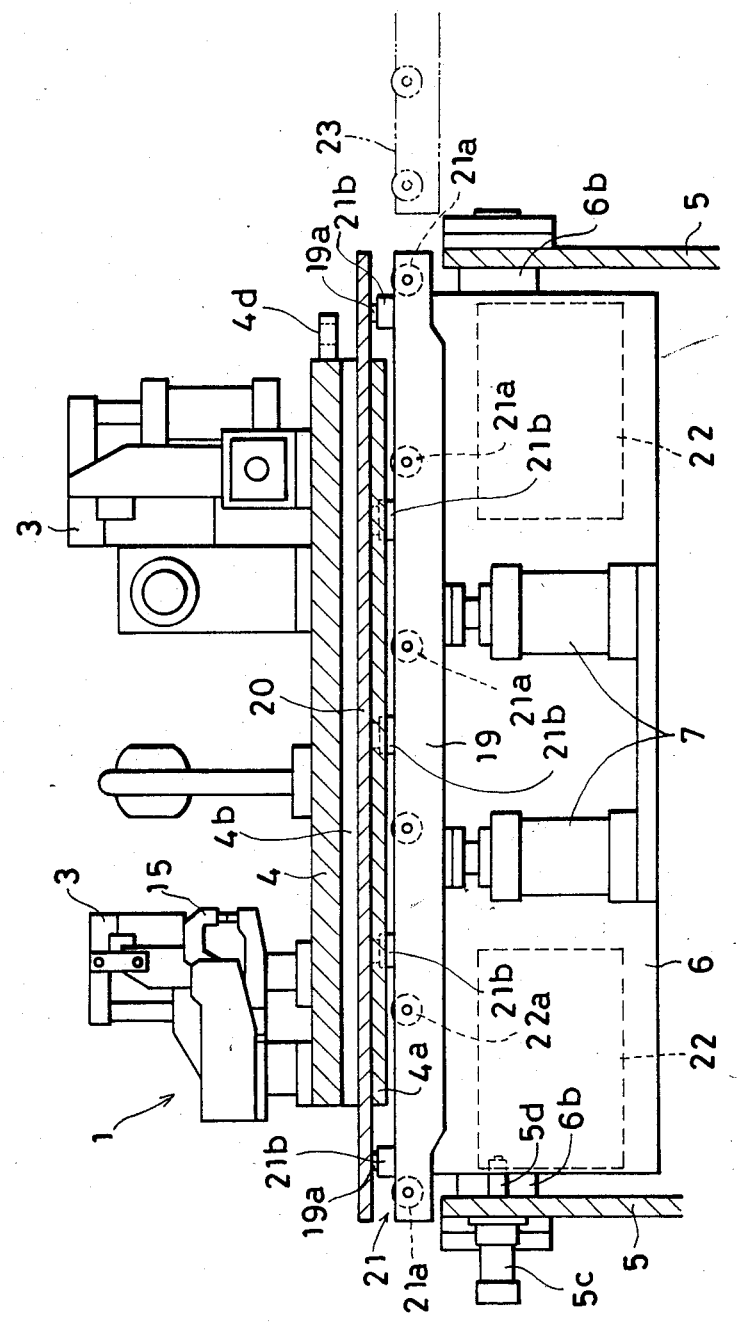
FIG. 6 is a sectional view taken along the line VI—VI in FIG. 5.

At the time of replacement of the jig body 4, the jig table 1 is returned to the setting station A from the welding station B in a state that each cam plate 11 is down so that a pin 5d arranged to be moved with a lock cylinder 5c, provided on the carrier 5, is brought into engagement with the jig base 6, as shown in FIG. 6. This keeps the jig base 6 in its horizontal posture and carries out the replacement thereof. A cylinder 11b rises and falls with the cam plate 11.

Each conveying chain 10 extends between a driving sprocket 10a and plural idle sprockets 10b provided on each side plate 8 and is driven to circulate in either the forward or reverse direction. A pair of the driving sprockets 10a, provided on the two side plates 8, are interconnected through a synchronizing shaft 10c so that the two sprockets 10a may be synchronously driven by a driving motor 10d provided on one of the two side plates 8.

At the welding station B, there is disposed a workpiece holding means 12 on an upper side thereof and two additional welding means 13 on both sides thereof. The holding means 12 is provided with plural clamp members 12a for clamping the workpiece W. The clamp members 12a are on an upper portion of a machine frame 14 above the welding station B and extend downwards. Each additional welding means 13 comprises an industrial robot having welding machines 13a so that the workpiece W, held by the holding means 12, may be applied with a predetermined additional weld by the machines 13a.

According to the present invention, the jig table 1 is provided with welding machines 15 mounted thereon so that, during the time that the jig table 1 is being advanced to the welding station B, the workpiece W on the jig table 1 may receive a temporary weld by the welding machines 15. In addition, there is an elevating means 16 for elevating and lowering the conveying means 2 so that, while the jig table 1 is being reciprocated between the two stations A and B, the jig table 1 may be moved upwards and downwards.

A plurality of the welding machines 15 are provided on the jig body 4 of the jig table 1 at positions corresponding to respective temporary fixing positions of the plural divided parts forming the workpiece W. The elevating means 16 comprise a pair of X-shaped link mechanisms which are connected to the respective side plates 8, on both sides of the conveying means 2. The X-shaped link mechanism on each side comprises a pair of links 33 and 34 which are crossed in the form of X and are pivotally interconnected at a crossing point 35 of the middle portions thereof. In addition, the links 33 and 34 are pivotally tally attached at their upper ends to the side plate 8 on the side surface of the conveying means 2, and at their lower ends to a stationary frame 36 provided on the lower side of the conveyor 2. An upper end pivot portion 33a of the first link 33 is arranged to be slidable horizontally along a guide portion 37 provided on the side plate 8, and a lower end pivot portion 34a of the second link 34 is arranged to be moved along a guide portion 39 made in the stationary frame 36 by means of a driving source 38 such that the slide plate 8 may be moved upwards and downwards. Numeral 33b denotes a lower end pivot portion of the first link 33, numeral 34b denotes an upper end pivot portion of the second line 34.

The guide portion 37 provided on the side plate 8 is so constructed that, as shown in FIGS. 1 and 2, a movable frame 37b is movable horizontally along upper and lower guide rails 37a provided on the side plate 8, and an upper end of the first link 33 is pivotally attached to the movable frame 37b. The guide portion 39 provided on the stationary frame 36 is in the form of a long groove, and the lower end pivot portion 34a the second link 34 is in slidable engagement therewith through a movable member 39a mounted on the same shaft. A piston rod 38a extending from a cylinder functions as a driving source 38 and is connected to the pivot portion 34a.

A delivery means 17 is provided for delivering the workpiece W, which has received additional welds at the welding station B, from the jig table, to a discharging station C in front thereof. As shown in FIG. 3, the means 17 comprises a carrier 17a supported on guide rails 18 extending between the two stations B and C. A receiving member 17c for the workpiece W is mounted on the carrier 17a by means of a cylinder 17b which is movable upwards and downwards, and the carrier 17a is connected to the jig table 1 by a connecting rod 17d so that the carrier 17a has a reciprocating movement between the discharging station C and the welding station B, in response to the reciprocating movement of the jig table 1 between the welding station B and the setting station A.

The operation of the foregoing apparatus is as follows:

First, the plural divided parts comprising the workpiece W, are set on the jig table 1 located at the setting station A. Thereafter, the conveying means 2 and the elevating means 16 are operated synchronously, and thereby, the jig table 1 is moved to advance to the welding station B while being moved upwards, and at the same time, that is, during moving of the jig table 1, the workpiece W is temporarily welded by the welding machines 15 on the jig table. At the time of completion of the advance movement of the jig table 1, the jig table 1 reaches a predetermined workpiece transfer position which meets the workpiece holding means 12 provided on the upper portion of the welding station B, and at the same time, the temporary welding of the workpiece W is completed. Thus, the time lag is eliminated which is caused by either temporary welding or upward movement of the jig table 1 to the workpiece transfer position from the completion of the advance movement of the jig table 1 and, therefore, the transfer of the workpiece W to the holding means 12 from the jig table 1 can be carried out at a high efficiency.

After the completion of the transfer of the workpiece, the jig table 1 is returned to the setting station A by an operation which is the reverse of the above, and at the same time, the workpiece W, held by the holding member 12, is additionally welded by the additional welding means 13, and in addition, during this welding operation, the next workpiece W is set on the jig table 1, which has been returned to the setting station A.

At this time, the carrier 17a of the delivery means 17 is moved in conjunction with the returning means of the jig table 1 so as to be introduced into the welding station B to wait for completion of the additional welding, and the receiving member 17c of the discharging means 17 is moved upwards and downwards for receiving a completely welded workpiece W thereon from the holding member 12.

After the receiving of the workpiece product W, the jig table 1 is again advanced to the welding station B in almost the same manner as above, and the carrier 17a is delivered to the discharging station C for unloading the workpiece product W therefrom, and at the same time, the next workpiece W on the jig table 1, which has already been subjected to temporary welding is transferred to the holding member 12. Thus, by repeating the foregoing operations, welding operations of the workpieces W can be carried out in succession one step after another.

Depending on the particular kind or model of the workpiece W, it often occurs that the temporary welding thereof is not completed during the advance movement of the jig table 1. In this case, after the completion of the advance movement of the jig table 1, the subsequent temporary welding of the unwelded portions thereof is carried out by the additional welding means 13 and thereafter, the workpiece W is transferred to the workpiece holding means 12. Even in this situation, the time lag can be extremely short, in comparison with a conventional apparatus wherein the temporary welding begins after the completion of the advance movement of the jig table.

In order to change the particular kind or model of the workpiece W to be welded, the jig body 4 of the jig table 1 and the workpiece holding member 12 are replaceable with respective predetermined replacements. For this purpose, it can be considered that a replacement operation is carried out by using a lifting means such as a crane or the like, but this technique is low in working efficiency.

Figure 5:
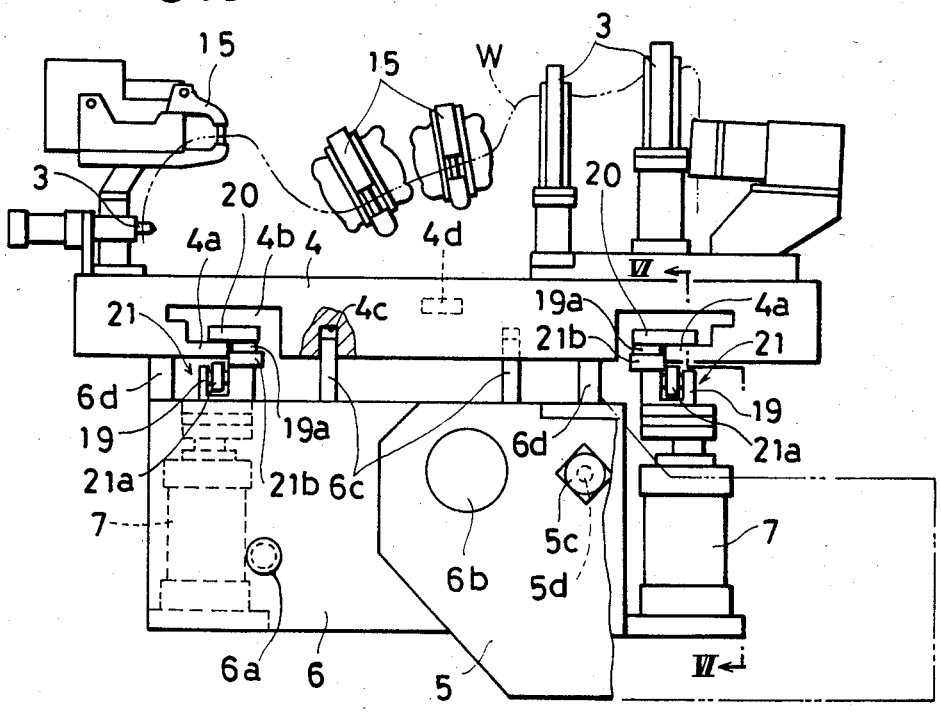
FIG. 5 is a side view of a jig table.

Accordingly, in the illustrated embodiment, respective replacing mechanisms for carrying out a replacement operation of the jig body 4 and the workpiece holding member 12 at a high efficiency are constructed as follows:

First, the replacement mechanism for the jig body 4 is explained as follows:

As shown in FIGS. 5 and 6, the jig base 6 is provided with an elevating frame 19 which is movable upwards and downwards in relation to the jig body 4. Additionally, there is a clamp member 20 which is arranged so that, by lowering the elevating frame 19, the clamp member 20 is brought into engagement with the jig body 4 to press the engaged body 4 for fixing it to the jig base 6, and a guide member 21 is arranged so that, by elevating of the elevating frame 19, the guide member 21 is brought into abutment with the jig body 4 for supporting the jig body 4 so as to be laterally movable.

In more detail, a pair of front and rear L-shaped grooves 4b, which extend laterally are formed in the lower surface portion of the jig body 4 so that there remains therein respective lower side tab portions 4a. A pair of the elevating frames 19 are disposed in a front and rear relationship and extend in the lateral direction along the grooves 4b and also each of the elevating frames 19 is arranged to be movable upwards and downwards by a pair of right and left cylinders 7 attached to the jig base 6.

Each elevating frame 19 is provided with plural pins 19a arranged to be inserted in each groove 4b, and the foregoing clamp members 20 each comprise a plate-shaped member which is laterally long and faces an upper surface of the tab portion 4a attached to top portions of the pins 19a. Additionally, a plurality of first guide rollers 21a, cooperating with the guide member 21, are pivotally supported thereon so as to face a lower surface of the tab portion 4a, and each of second guide rollers 21b, which are arranged to be in abutment with the inner end edge of the tab portion 4a, is pivotally supported on each pin 19a so that the jig body 4 may be supported so as to be laterally movable by the first guide rollers 21a and vibrations thereof in the front and rear directions are prevented by the second rollers 21b.

The jig body 4 is additionally arranged so as to be supported on receiving seats 6d on the jig base 6, and be set in position by positioning pins 6c, on the jig base 6, that are arranged to be mounted in positioning openings 4c made in the lower surface jig body 4.

A hook 4d is provided on a lateral side surface of the jig body 4, a transformer 22 for the welding machines 15 is mounted on the jig base 6, and a receiving base 23 is provided for jig replacement.

Next, the operation of the foregoing replacement mechanism will be explained as follows:

In an ordinary case, the elevating frame 19 is applied with pressure moving it downwards by a downward movement of the attaching and detaching cylinders 7, whereby the clamp member 20 is brought into engagement with the tab portion 4a for pushing the jig body 4 downwards. Consequently, the jig body 4 is fixed, under the pressure, to the jig base 6 while the jig body 4 is set in position by the positioning pins 6c.

When the jig body 4 is to be replaced in correspondence with a change of the kind of the workpiece W, the elevating frame 19 is raised by the attaching and detaching cylinders 7. The pressed fixing of the jig body 4 to the tab portions 4a by the clamp member 20 is thus released, and at the same time, the guide member 21 on the elevating frame 19 is brought into abutment with the lower surface of the tab portion 4a for supporting the same. The jig body 4 is lifted upwards to leave the jig base 6 while supported on the guide member 21. If the jig body 4 is elevated to a position at which the same is apart from the positioning pins 6c, the jig body becomes movable laterally. Thus, by pulling on the hook 4d on the lateral side surface of the jig body, the jig body 4 can be pulled out onto the receiving base 23 on the lateral side thereof. Thereafter, another jig body 4 is introduced into a position on the guide member 21 through the receiving base 23, and the elevating frame 19 is lowered in almost the same manner as above so that the jig body 4 may be fixed under the pressure thereof to the jig base 6 by the clamp member 20.

Next, the replacement mechanism for the workpiece holding means 12 will be explained as follows:

As shown in FIGS. 1 and 2, a rotary shaft 24 is provided horizontally on an upper portion of the machine frame 14, and a plurality of the workpiece holding means 12, for example, three units are provided on a supporting member 25. The rotary shaft 24 is arranged to be rotatable by means of an index means 26. The index means 26 comprises a rotation driving mechanism in which the rotary shaft 24 is arranged to be rotated by a rack 28 provided on the machine frame 14 meshed with a pinion 27 on the shaft 24. The rack 28 is moved forwards and backwards by a cylinder 29. The rotary shaft 24 is thus, arranged to be set in position such that a stopper 31, provided on the machine frame 14 and directed forward is brought into contact with index grooves 30a in an index plate 30 fixed on the rotary shaft 24. The index grooves 30a are at three circumferential positions and the stopper 31 is movable to be brought into engagement and disengagement with any of the index grooves 30a by a cylinder 32. By the cooperation of the two mechanisms, the rotary shaft 24 is turned by a predetermined angle, and consequently, any desired one of the three workpiece holding means 12 is selected to be positioned at an operative position below the rotary shaft 24. Thus, a replacement of the workpiece holding means 12 at the time of the change of the kind of the workpiece W can be carried out at high efficiency.

Thus, according to the present invention, the jig table is provided thereon with welding machines for applying temporary welds to the workpiece set on the jig table, and additionally, a conveying means for reciprocating the jig table between a setting station and a welding station is arranged to be movable upwards and downwards by an elevating means, so that the temporary weld and the elevating of the jig table to the predetermined position can be carried out while the jig table is moved to advance to the welding station. Consequently, a time lag from the completion of additional welding to the beginning of the next additional welding can be substantially shortened which results in an improvement in productivity, as compared with a conventional technique wherein the temporary welding of the workpiece and the elevating of the jig table are carried out after the completion of the advance movement of the jig table.

The present invention may be embodied in other specific forms without departing from the spirit or essential characteristics thereof. The presently disclosed embodiments are, therefore, to be considered in all respects as illustrative and not restrictive, the scope of the invention being indicated by the appended claims, rather than the foregoing description, and all changes which come within the meaning and range of equivalency of the claims are, therefore, to be embraced therein.

What is claimed is:

1. An automatic welding apparatus comprising:
   (a) a replaceable jig table;
   (b) conveying means for carrying said jig table between a setting station and a welding station;
   (c) temporary welding means mounted on said jig table for applying temporary welds to a workpiece while said jig table is being moved by said conveying means;
   (d) at least one holding means at said welding station for removing said temporarily welded workpiece from said jig table and holding said workpiece therein; and
   (e) additional welding means positioned with respect to said holding means for permanently welding said workpiece while said workpiece is held by said holding means and said jig table is being returned to the setting station by said conveying means.

2. An automatic welding apparatus as set forth in claim 1, including elevating means coupled to said conveying means for raising and lowering said jig table, wherein said elevating means raises said jig table as it moves between said setting station and said welding station.

3. A welding apparatus as set forth in claim 1, wherein said jig table comprises:
   (a) a carrier coupled to said conveyor means and moveable thereon;
   (b) a jig base mounted on said carrier;
   (c) a jig body detachably mounted on said jig base; and
   (d) elevating frame means for raising and lowering said jig body on said jig base, said elevating frame means including clamp means for clamping said jig body to said jig base when said elevating frame means is lowered and guide means for supporting said jig body on said jig base for the lateral movement thereof when said elevating frame means is raised.

4. An automatic welding apparatus as set forth in claim 3, wherein said jig base is inclined with respect to the horizontal at the setting station, said jig base including a protrusion and wherein said apparatus includes a cam plate having a cam groove therein, said protrusion in said jig base extending into said cam groove, wherein when said cam plate is rotated to an upright position, said jig base is moved from the inclined position to a horizontal position, and wherein said carrier includes locking means to hold said jig base in the horizontal position.

5. An automatic welding apparatus as set forth in claim 1, wherein said at least one holding means includes a plurality of holding means and wherein said apparatus includes a rotary shaft, said holding means being mounted on said rotary shaft and indexing means for rotating said shaft such that selected ones of said holding means can be positioned at the welding station.

6. An automatic welding apparatus as set forth in claim 1, wherein said elevating means comprises a pair of X-shaped link means, each link means including first and second crossed link members pivotally coupled at the crossing point thereof wherein the first link member of each link means is pivotally attached to said conveyor means at one end thereof and to a stationary frame at the other end thereof, and wherein the second link member of each link means has one end slidably mounted in a guide portion in said stationary frame and the other end mounted in a guide portion in said conveyor means.

* * * * *